(12) United States Patent
Andalia

(10) Patent No.: US 7,448,210 B1
(45) Date of Patent: Nov. 11, 2008

(54) WAVE POWERED SYSTEM FOR GENERATING ENERGY

(76) Inventor: Roger R. Andalia, 21450 SW. 98th St., Miami, FL (US) 33189

( * ) Notice: Subject to any disclaimer, the term of this patent is extended or adjusted under 35 U.S.C. 154(b) by 464 days.

(21) Appl. No.: 11/255,639

(22) Filed: Oct. 24, 2005

(51) Int. Cl.
*F03C 1/00* (2006.01)

(52) U.S. Cl. .............................. 60/498; 60/500; 290/42; 290/53

(58) Field of Classification Search .................. 60/497, 60/498, 500, 501; 290/42, 53
See application file for complete search history.

(56) References Cited

U.S. PATENT DOCUMENTS

| | | | | |
|---|---|---|---|---|
| 4,914,915 A * | 4/1990 | Linderfelt | .................... | 60/502 |
| 6,389,810 B1 * | 5/2002 | Nakomcic | .................... | 60/502 |
| 6,644,027 B1 * | 11/2003 | Kelly | .......................... | 60/498 |
| 7,242,106 B2 * | 7/2007 | Kelly | .......................... | 290/42 |

* cited by examiner

*Primary Examiner*—Hoang M Nguyen
(74) *Attorney, Agent, or Firm*—Sanchelima & Assoc., P.A.

(57) ABSTRACT

An apparatus powered by waves to generate hydraulic energy that includes a housing structure, an inlet portion, a central channel, an outlet portion and floater assemblies positioned within the channel. Within the housing structure the different components are installed. The inlet has an open end that is constrained at the point where it meets the central channel. Several floating assemblies are contiguously aligned and exposed to the movements caused by the waves running through the channel. The floaters include a hingedly mounted arm and a distal end. The arm is rotably mounted to a fixed point in the housing. The rotational movement is transmitted to a reciprocating piston of a hydraulic system that generates pressurized fluid fed to a hydraulic line. A number of hydraulic storage devices are provided to store the hydraulic energy. A manifold assembly is connected to these storage devices to provide the necessary energy for hydraulic turbine generators of electricity.

4 Claims, 8 Drawing Sheets

WAVE POWERED SYSTEM FOR GENERATING ENERGY

BACKGROUND OF THE INVENTION

1. Field of the Invention

The present invention relates to a system powered by waves to generate energy, and more particularly, to generate hydraulic energy.

2. Description of the Related Art

Several designs for harnessing and generating energy from the ocean waves have been designed in the past. A summary of past developments has been documented in Misha Cornes' article Ocean Wave energy Conversion: The Next Wave in Renewable Energy?-http://www.bfi.org/Trimtab/summer01/ocean. None of them, however, includes a housing assembly that protects the system that is cooperatively adapted to receive concentrated waves that are substantially contiguous over a predetermined range of waves. It is desirable to receive contiguous waves rather than sudden large waves for several reasons, including the optimization of the equipment design. The desirability of achieving this resonance between the waves and the system capturing their movement is documented in Richard J. Seymour, Ocean Energy Recovery, The State of the Art, American Society o Civil Engineers. Theoretical analyses of wave energy conversion have demonstrated how a unit absorbs energy from ocean waves. The important feature is that in response to incident waves, the apparatus or system generates waves to cancel the passing and/or reflected waves. The analyses also indicate that for maximum power conversion, the velocity should be in phase with the exciting force; this condition occurs when the system is in resonance. However, if the devices are in resonance, the stress on the components will force the designer to overdesign the system to protect the former. There have been many instances where the devices have been damaged. These authorities, thus, teach away from the present invention where the approach is to avoid resonance.

Applicant believes that a related reference corresponds to U.S. Pat. No. 2,848,189 issued to John A. Caloia on Aug. 19, 1958 for an apparatus for producing power from water waves. Caolia claims that his apparatus works with small as well as large waves. However, it differs from the present invention because it requires levers 16 of varying lengths to reach a given range of waves.

Applicant believes that another related reference corresponds to U.S. Pat. No. 4,454,429 issued to Frank Buonome on Jun. 12, 1984 for a method of converting ocean wave action into electrical energy using a number of floats that are in a parallel disposition with respect to each other. However, it differs from the present invention because the floats are not protected and they will be exposed to substantially the same waves simultaneously rather than a continuous movement of waves.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a system that utilizes the fluctuative energy of the waves of the ocean to create energy in an efficient cause-effect manner.

It is another object of this invention to create a system that can store the energy generated for selective subsequent use.

It is still another object of the present invention to provide a system that is optimized to receive continuous waves with the movement capturing assemblies.

It is yet another object of this invention to provide such a system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
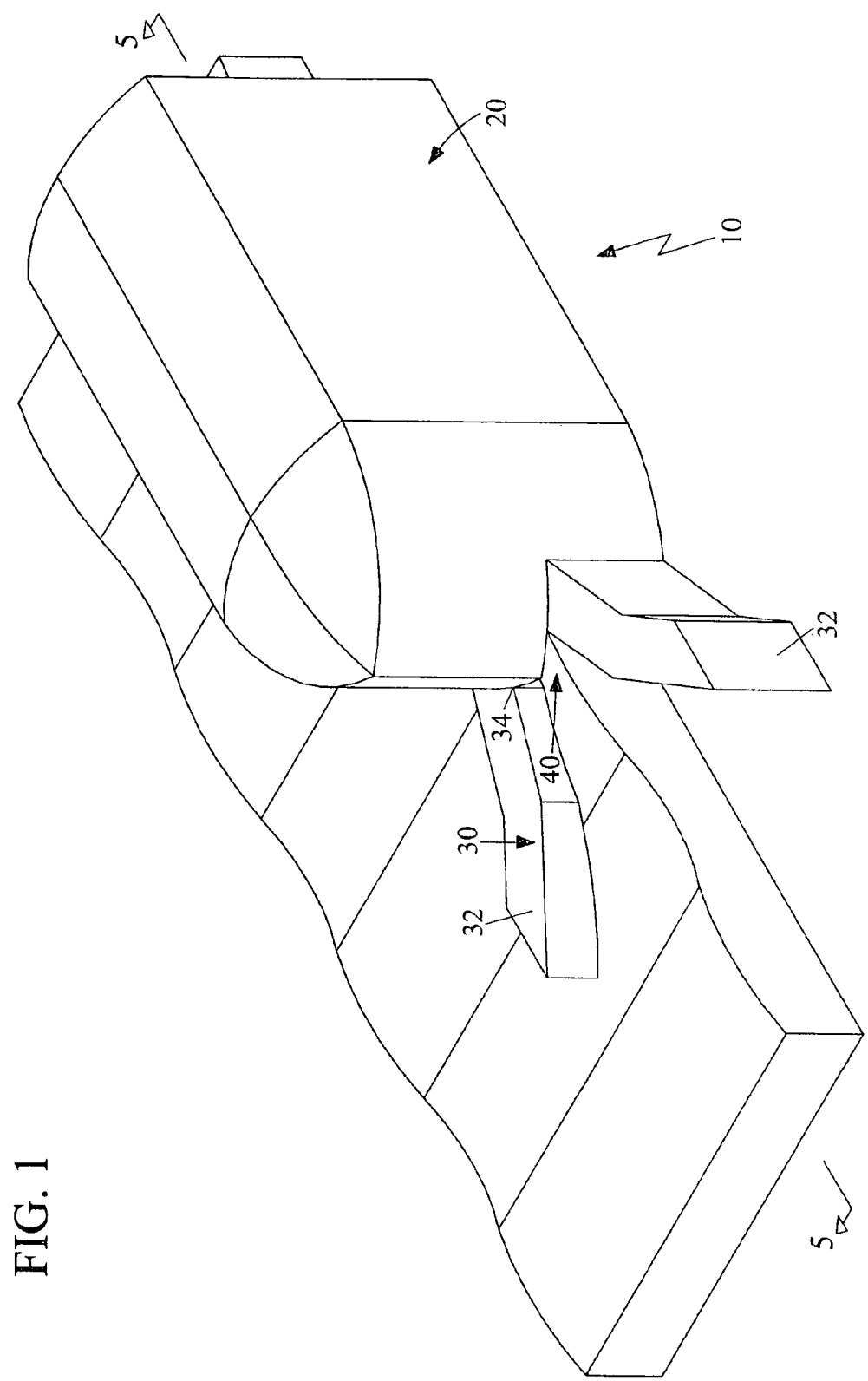
FIG. 1 represents an isometric view of the housing structure used with the system powered by waves to generate energy object of the present application with a partial representation of a body of water.
Figure 2:
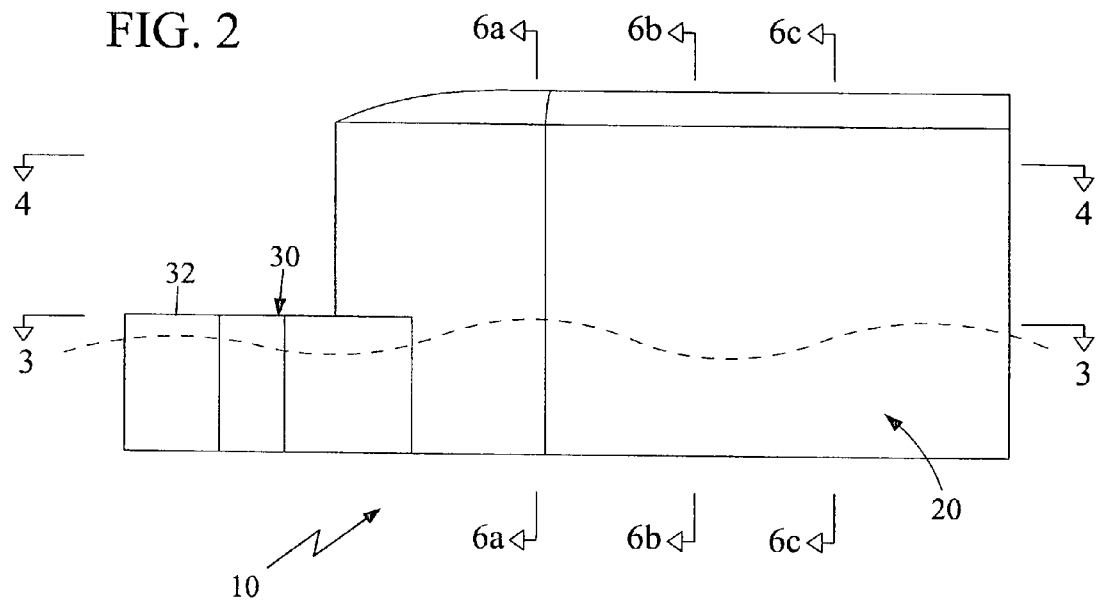
FIG. 2 is an elevational view of the housing structure and wave concentrator with the waves represented in broken lines.
Figure 3:
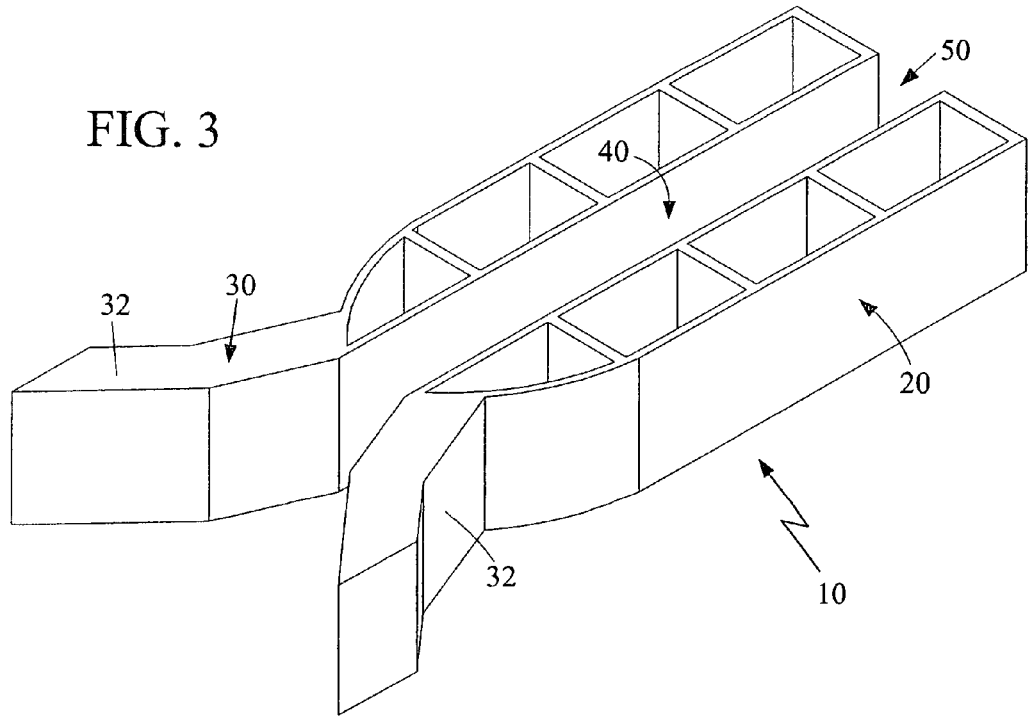
FIG. 3 shows an isometric cross-section view taken from line 3-3 in FIG. 2.
Figure 4:
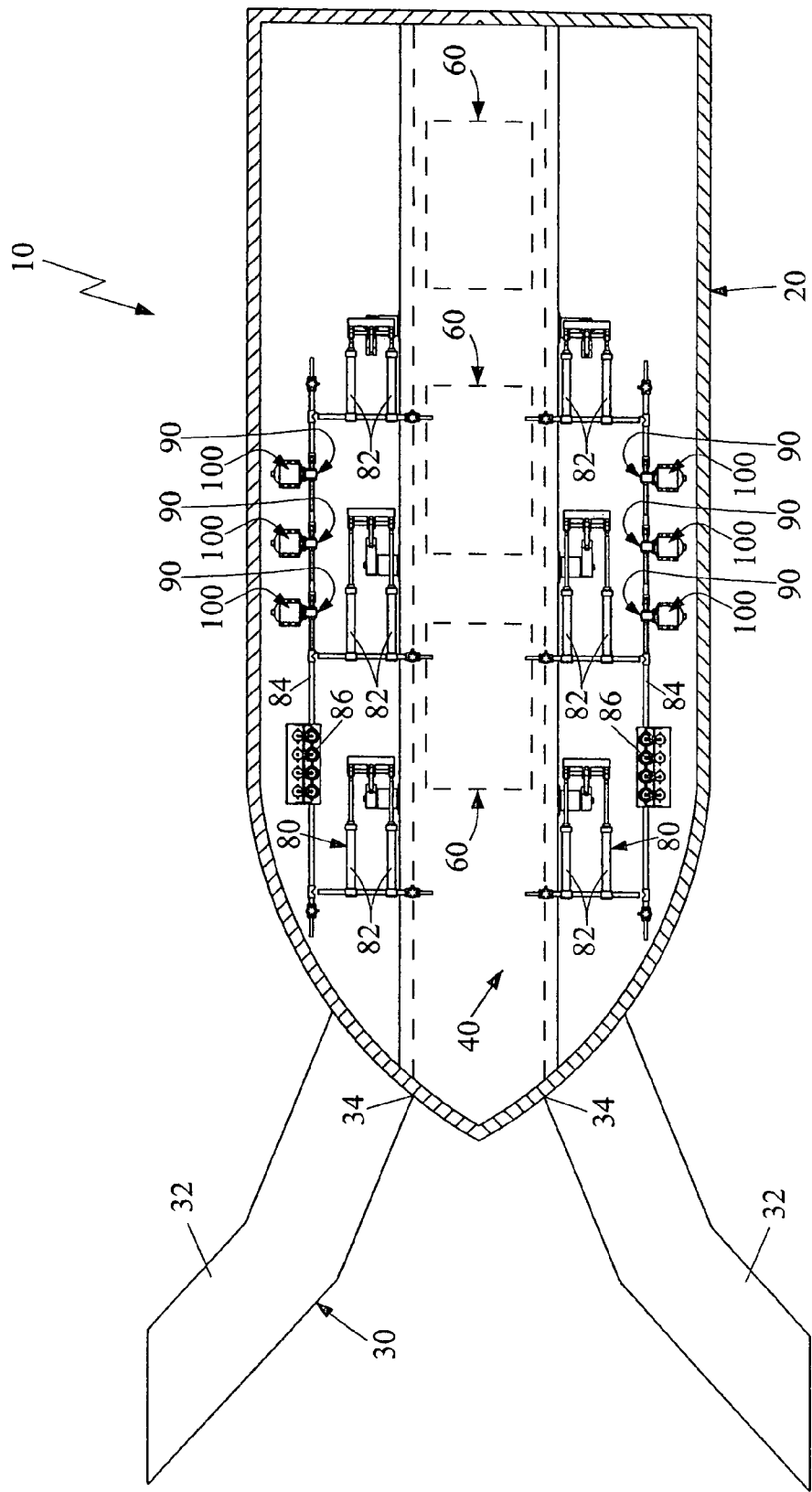
FIG. 4 illustrates a top cross-section view taken from line 4-4 in FIG. 2, showing the structure of the housing structure.
Figure 5:
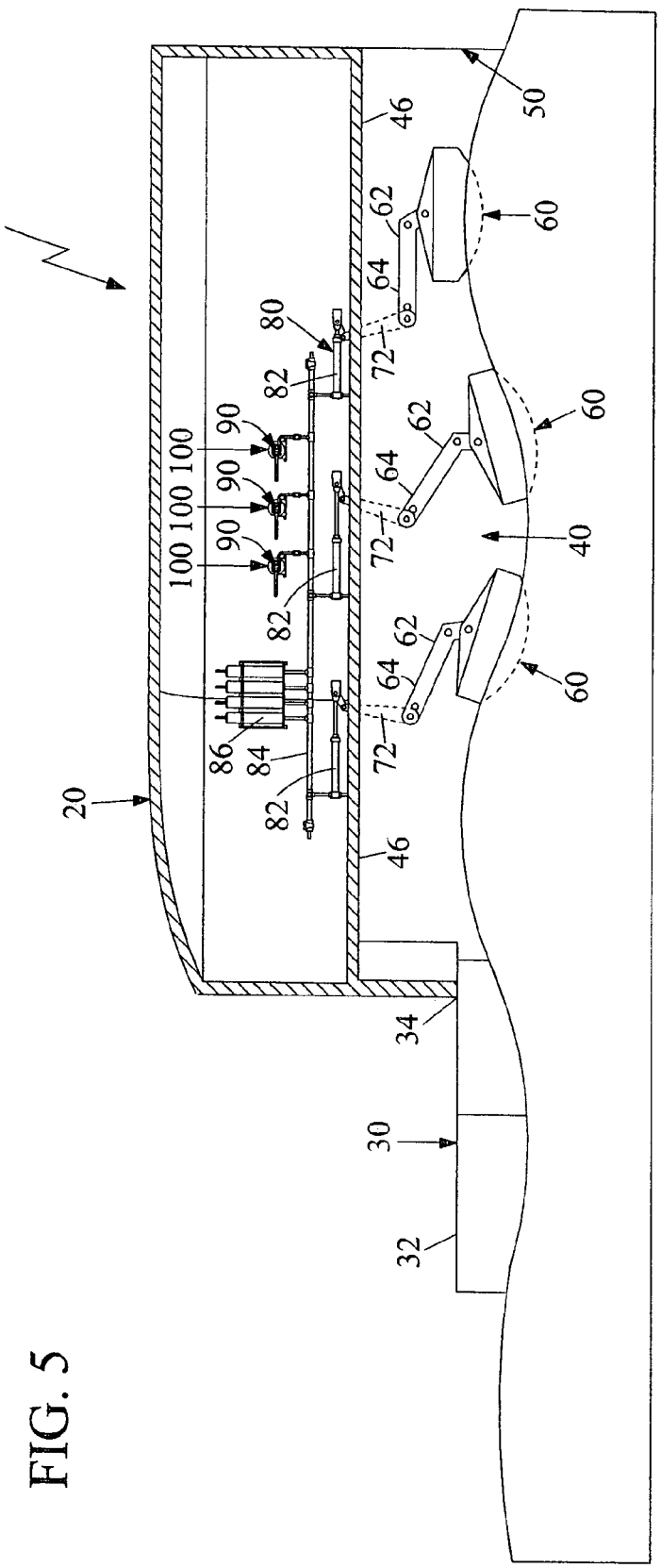
FIG. 5 is an elevational cross-section view taken from line 5-5 in FIG. 1.
Figure 6A:
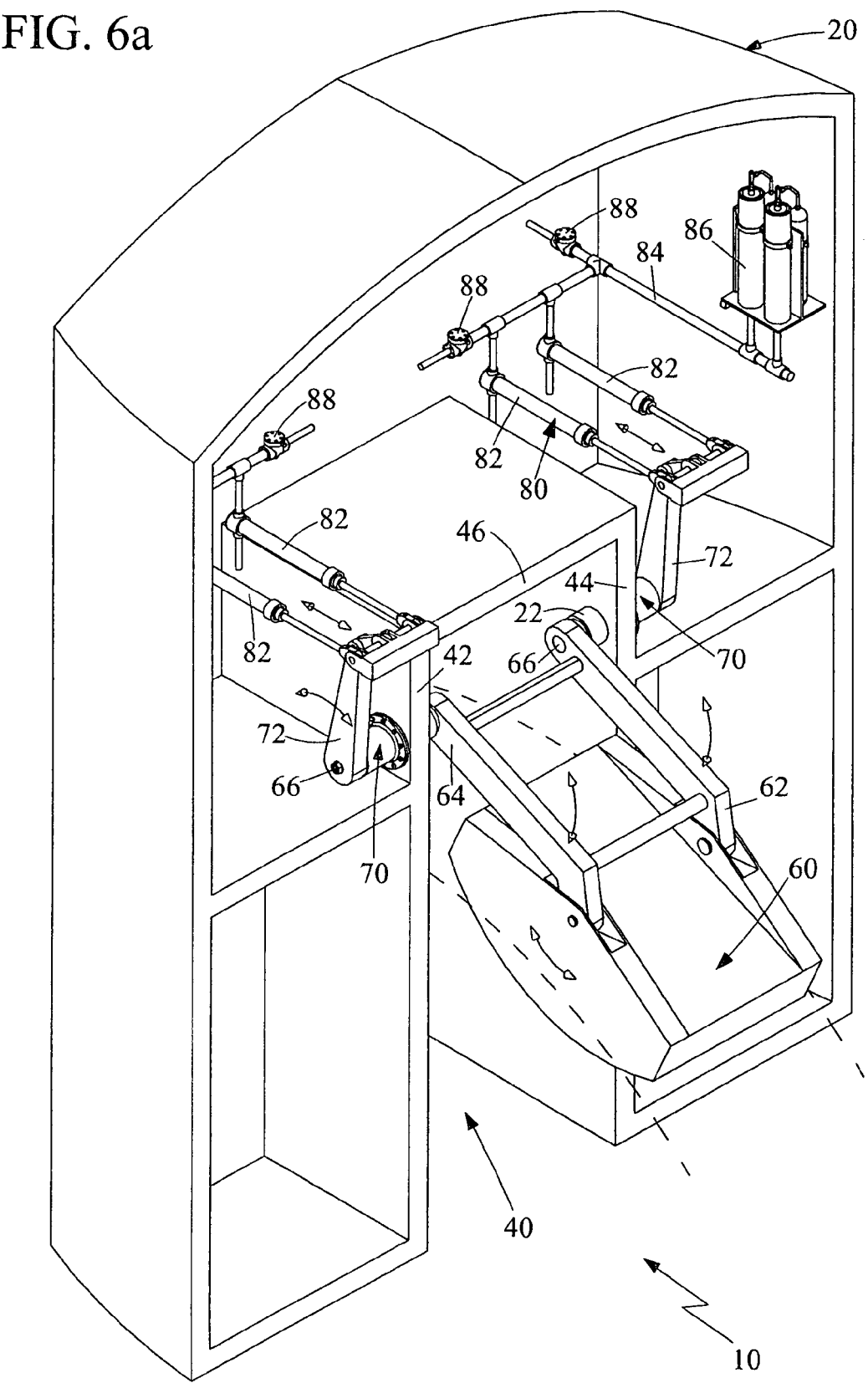
FIG. 6a shows an isometric view of the cross-section taken along line 6a-6a in FIG. 2 showing one of the floater assemblies in a wave-ascending position. The wave is shown with broken lines.
Figure 6B:
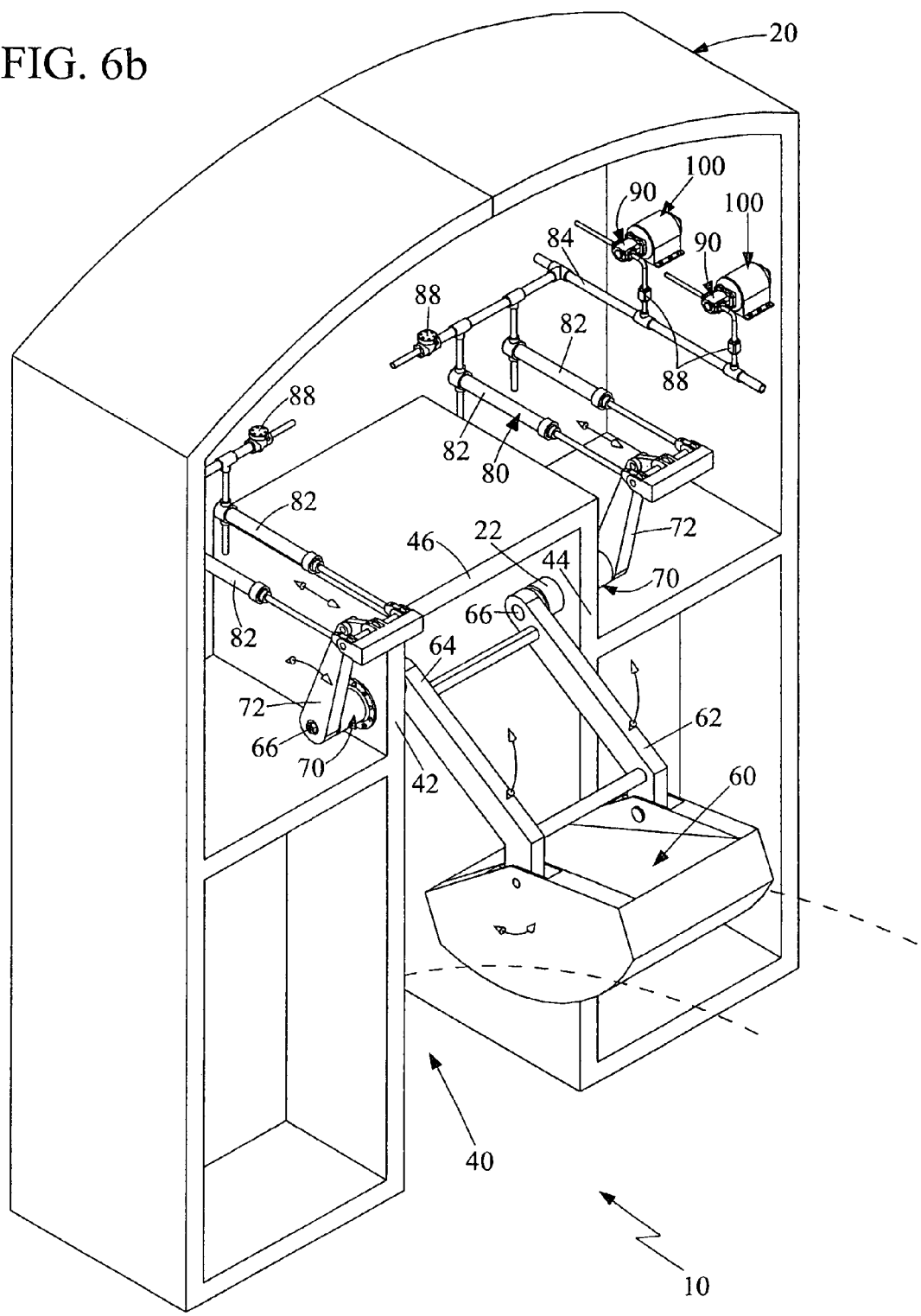
FIG. 6b represents an isometric view of the cross-section taken along line 6b-6b in FIG. 2 showing the next floater assembly in the crest of the wave position. The wave is shown with broken lines.
Figure 6C:
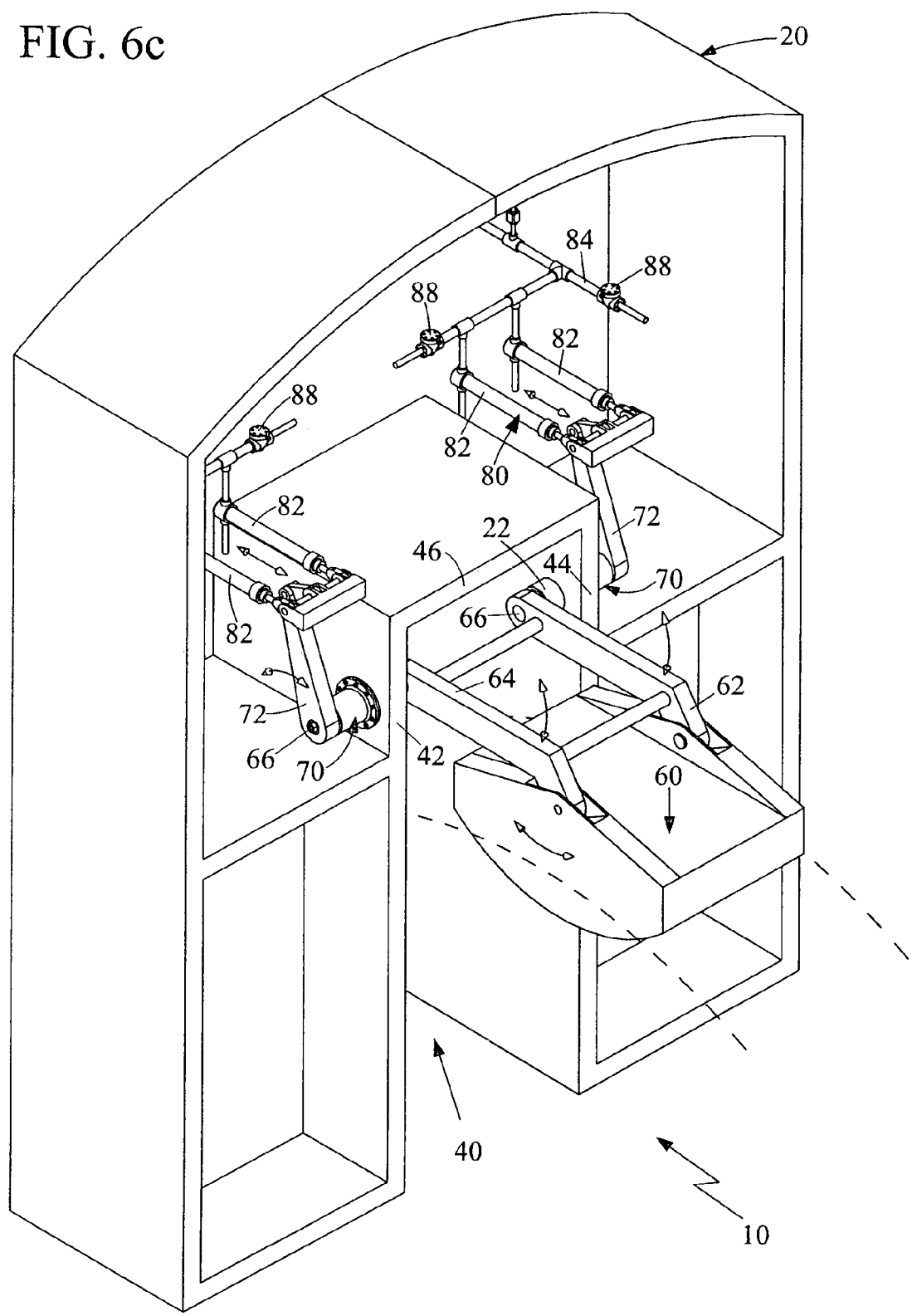
FIG. 6c is an isometric view of the cross-section taken along line 6c-6c in FIG. 2 showing the third floater assembly in a wave-descending position. The wave is shown with broken lines.
Figure 7:
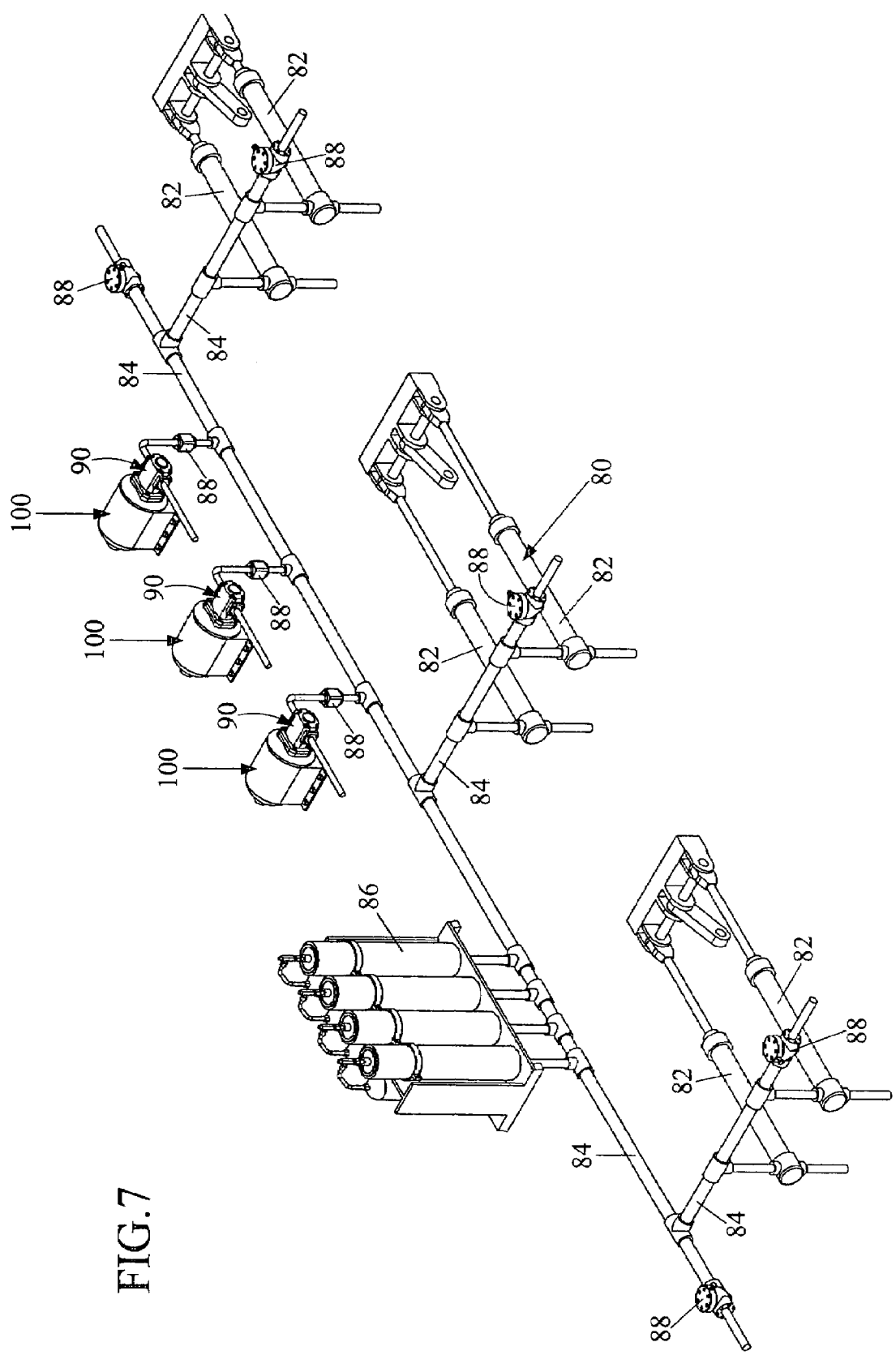
FIG. 7 shows an isometric view of the hydraulic system that is connected to the piston assemblies, which in turn are connected to the floater assemblies.

Referring now to the drawings, where the present invention is generally referred to with numeral 10, it can be observed that it basically includes housing structure 20, inlet portion 30, central channel 40, outlet portion 50, floater assemblies 60 positioned within channel 40.

Housing structure 20 is utilized and within which the different components are installed. Housing 20 includes an inlet 30 and outlet 50 with channel 40 in between. Inlet 30 has a wave concentrator or tapered channel with open end 32 that is constrained at point 34 where it meets central channel 40. Optionally, channel 40 is covered with longitudinally extending lateral walls 42; 44 and channel cover wall 46. Covering channel 40 is important to protect the mechanical equipment from corrosion. The height of inlet 30 at point 34 is such that protection is provided to the internal equipment from large waves that exceed a predetermined height. Inlet 30 thus provides the means for enhancing the waves received by concentrating the mass of water resulting in larger waves inside housing 20. Several floating assemblies 60 are sequentially aligned and exposed to the movements caused by the waves running through channel 40. Floaters 60 include hingedly mounted arm 62 and its distal end 64 is rotably mounted to fixed point 22 in housing 20. Axle 66 in turn transmits the rotational movement through clutch assembly 68 to reciprocating piston 82 of hydraulic system 80 that generates pressurized fluid fed to hydraulic pipe or line 84. Other equivalent devices can be used to track the valleys and crests of the waves to a reciprocating movement for subsequent storage of energy.

A number of hydraulic storage devices 90 are provided to store the hydraulic energy in one of the preferred embodiments. Other equivalent devices can be used to store energy including electrical turbine generators with batteries, etc. In this embodiment, manifold assembly 100 is connected to storage devices 90 to provide the necessary energy for hydraulic turbine generators of electricity.

It is important to arrange floating assemblies 60 sequentially to alternate the production of the pressurized fluid. In that manner, a floater may be on the crest and the next floater may be in a valley or somewhere in between but contiguous floater assemblies 60 will not coincide on substantially the same position. This will avoid unnecessary temporary large concentrated stress on hydraulic pipes or lines 84.

What is claimed is:

1. An apparatus for converting wave movement to energy that can be stored, comprising:
    A) housing means having a longitudinally aligned internal channel with an inlet and an outlet, said housing means being partially immersed in a body of water and longitudinally disposed along the path of waves, said inlet having predetermined dimensions to permit waves of less than a predetermined height to pass though, and an outlet that freely permits the waves to exit, said housing means defining a longitudinally extending internal space and said housing means including a wave concentrator at said inlet for increasing the flow of water through said inlet thereby raising the wave height;
    B) a plurality of floating means longitudinally aligned within said space inside said channel, and said floating means being separated from each other a predetermined distance, to track said waves thereby transforming them to a reciprocating movement; and
    C) means for transforming said reciprocating movement into storable energy.

2. The apparatus set forth in claim 1 wherein said internal channel is longitudinally covered with two lateral walls and a cover wall.

3. The apparatus set forth in claim 2 wherein the separation between said floating means track different points of the waves.

4. The apparatus set forth in claim 3 wherein said floating means that are contiguously disposed do not track the maximum points of the crests and valleys simultaneously.

* * * * *